US011513434B1

(12) United States Patent
Hill et al.

(10) Patent No.: US 11,513,434 B1
(45) Date of Patent: Nov. 29, 2022

(54) PROJECTOR MOUNT ASSEMBLY FOR SPORTS ENCLOSURES

(71) Applicant: ALLSPORTSYSTEMS, INC., Fuquay-Varina, NC (US)

(72) Inventors: David A. Hill, Fuquay-Varina, NC (US); Caelan Jones, Holly Springs, NC (US)

(73) Assignee: ALLSPORTSYSTEMS, INC., Fuquay-Varina, NC (US)

( * ) Notice: Subject to any disclaimer, the term of this patent is extended or adjusted under 35 U.S.C. 154(b) by 100 days.

(21) Appl. No.: 17/181,837

(22) Filed: Feb. 22, 2021

Related U.S. Application Data

(60) Provisional application No. 63/135,193, filed on Jan. 8, 2021.

(51) Int. Cl.
| | |
|---|---|
| *G03B 21/54* | (2006.01) |
| *F16M 13/02* | (2006.01) |
| *A63B 71/02* | (2006.01) |
| *A63B 71/06* | (2006.01) |

(52) U.S. Cl.
CPC ............ *G03B 21/54* (2013.01); *A63B 71/022* (2013.01); *A63B 71/0622* (2013.01); *F16M 13/022* (2013.01); *F16M 2200/028* (2013.01); *F16M 2200/066* (2013.01)

(58) Field of Classification Search
CPC ... G03B 21/54; A63B 71/022; A63B 71/0622; F16M 13/022; F16M 2200/028; F16M 2200/066
USPC ...................................................... 248/286.1
See application file for complete search history.

(56) References Cited

U.S. PATENT DOCUMENTS

| | | | | |
|---|---|---|---|---|
| 2009/0061971 | A1* | 3/2009 | Weitzner | A63F 13/213 463/2 |
| 2012/0267499 | A1* | 10/2012 | Abri | A61B 90/37 312/294 |
| 2014/0212004 | A1* | 7/2014 | Suk | G01C 11/02 382/107 |
| 2014/0251841 | A1* | 9/2014 | Corey | F16M 13/022 248/676 |
| 2015/0277214 | A1* | 10/2015 | Schuh | F16M 13/022 248/287.1 |
| 2018/0185724 | A1* | 7/2018 | Lalaoua | A63B 71/0605 |
| 2019/0374844 | A1* | 12/2019 | Dufourcq | G06F 3/165 |
| 2020/0129810 | A1* | 4/2020 | Suk | A63B 37/0022 |

OTHER PUBLICATIONS

ALLSPORTSYSTEMS, INC., "Assembly Guide for SkyRailPlus Cage Track Sliding Projector Mount," rev. Aug. 10, 2018 (16 pages).

* cited by examiner

*Primary Examiner* — Muhammad Ijaz
(74) *Attorney, Agent, or Firm* — Tillman Wright, PLLC; Neal B. Wolgin; David R. Higgins

(57) ABSTRACT

A projector mount assembly for a sports enclosure includes a frame structure mountable to rear and front cross beams of a sports enclosure, at least one extension bracket secured to the frame structure and mountable to the front cross beam, and a projector mounting arm mounted to the at least one extension bracket and extending forwardly therefrom. The projector mounting arm is adapted to support, and facilitate front-to-back adjustment of, a projector. The projector mounting arm is pivotable relative to the at least one extension bracket to facilitate adjustment of an elevation of the projector.

23 Claims, 19 Drawing Sheets

PROJECTOR MOUNT ASSEMBLY FOR SPORTS ENCLOSURES

CROSS-REFERENCE TO RELATED APPLICATIONS

The present application is a U.S. nonprovisional patent application of, and claims priority under 35 U.S.C. § 119(e) to, U.S. provisional patent application Ser. No. 63/135,193, filed Jan. 8, 2021, which '193 application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to projector mounts for sports enclosures, and, in particular, to sturdy and adaptable projector mounts for sports enclosures capable of permitting adjustment of projector height and distance relative to a projection screen.

Background

Sports enclosures are well known and are commonly used for practice and coaching of golf, baseball, and other sports. These enclosures are usually constructed of pipes, tubes, angle steel, or similar materials to form three-dimensional frame structures that are frequently surrounded with protective netting and the like. In many cases, these enclosures are open to one side or include a passageway at one side to permit ingress and egress into and out from the enclosure.

The shape of the enclosure provides an environment within which a person practicing or being coached can swing a piece of sports equipment (e.g., a golf club or a baseball bat) with reduced risk of unintentionally harming or injuring a person outside of the enclosure (whether by the piece of sports equipment or by a ball that is struck using the piece of sports equipment). In this respect, the environment established within the enclosure is conducive to learning or coaching a particular activity within a multi-use facility, such as a gym or training center.

Sports enclosures also commonly feature a projection screen suspended inside and toward the rear of the enclosure to provide a visual perspective to a person practicing or being coached. To display an image on a projection screen properly, the projector must be positioned at a precise distance from the projection screen. However, when positioning a projector, consideration must also be given to the activity taking place inside the enclosure. For example, where the activity taking place inside the enclosure involves swinging a golf club, the projector must be positioned at a height and location so as not to interfere with a participant's golf swing. In this regard, safety considerations often factor heavily in projector placement in sports enclosures.

One known projector mount assembly 2 for sports enclosures, shown in FIG. 1, utilizes a T-shaped frame 3 having vertically-oriented prongs 4 at opposite sides thereof that are received within sockets at the rear corners of the enclosure (not shown). The single central beam 5 of the "T" shape supports a projector at an end thereof and is telescopically adjustable to facilitate repositioning of the projector relative to the rear of the enclosure. However, the projector mount assembly of FIG. 1 does not provide for vertical adjustment of the projector, as might become necessary for display optimization on the projector screen and for safety concerns. Moreover, the T-shaped design limits implementation of the system only to certain types of sports enclosures.

Another known projector mount assembly 6 for sports enclosures utilizes a pair of plastic arms 7 that are anchored to front and rear crossbeams 8, 9 of the enclosure frame. Hook-shaped connectors secure the arms 7 to the rear crossbeam 8, and round hole connectors secure the arms 7 to the front crossbeam 9. Although the projector mount assembly 6 of FIG. 2 provides for vertical and front-to-back adjustment of a projector mounted to the arms 7, the weight of the projector can cause the assembly 6 to deform in at least some arrangements. Moreover, the projector mount assembly 6 of FIG. 2 is limited to implementation with respect to crossbeams having a round cross-sectional shape.

As such, a need exists for a sturdy projector mount for sports enclosures that facilitates positioning of the projector in a precise location to optimize image display on a projection screen. Further, a need exists for a sturdy projector mount for sports enclosures that facilitates positioning of the projector in a precise location to address safety concerns inherent to the sport or activity taking place within the enclosure. Still further, a need exists for a sturdy projector mount that is adaptable across a variety of different types of sports enclosures and frame configurations. These, and other needs, are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of projector mounts for sports enclosures, the present invention is not limited to use only in projector mounts for sports enclosures, as will become apparent from the following summaries and detailed descriptions of aspects, features, and one or more embodiments of the present invention.

Broadly defined, the present invention according to one aspect relates to a projector mount assembly for a sports enclosure. The projector mount assembly includes a frame structure mountable to rear and front cross beams of a sports enclosure, at least one extension bracket secured to the frame structure and mountable to the front cross beam, and a projector mounting arm mounted to the at least one extension bracket and extending forwardly therefrom. The projector mounting arm is adapted to support, and facilitate front-to-back adjustment of, a projector. The projector mounting arm is pivotable relative to the at least one extension bracket to facilitate adjustment of an elevation of the projector.

In a feature of this aspect, the projector mounting arm includes a pair of channels for retaining a slide assembly that supports the projector. In another feature of this aspect, the slide assembly is slidable within the channels.

In another feature of this aspect, the elevation of the projector is established by a repositionable locking pin upon which the projector mounting arm rests. In another feature of this aspect, the repositionable locking pin is received through an aperture of the at least one extension bracket.

In another feature of this aspect, the at least one extension bracket includes a hook portion that is engageable with a channel of the front cross beam.

In another feature of this aspect, the projector mount further includes at least one hooking bracket having a hook portion that is engageable with a channel of the rear cross beam.

In another feature of this aspect, one or more of the frame structure, the at least one extension bracket, and the projector mounting arm includes a steel material.

Broadly defined, the present invention according to another aspect relates to a projection system for a sports enclosure. The projection system includes rear and front cross beams, each of which is mountable at opposite sides of a sports enclosure. The projection system further includes a frame structure mounted to the rear and front cross beams, at least one extension bracket secured to each of the frame structure and the front cross beam, and a projector mounting arm mounted to the at least one extension bracket and extending forwardly therefrom. The projector mounting arm is adapted to support, and facilitate front-to-back adjustment of, a projector. The projector mounting arm is pivotable relative to the at least one extension bracket to facilitate adjustment of an elevation of the projector.

In a feature of this aspect, the projector mounting arm includes a pair of channels for retaining a slide assembly that supports the projector. In another feature of this aspect, the slide assembly is slidable within the channels.

In another feature of this aspect, the elevation of the projector is established by a repositionable locking pin upon which the projector mounting arm rests. In another feature of this aspect, the repositionable locking pin is received through an aperture of the at least one extension bracket.

In another feature of this aspect, the at least one extension bracket includes a hook portion that is received within a channel of the front cross beam.

In another feature of this aspect, the projection system further includes at least one hooking bracket having a hook portion that is received within a channel of the rear cross beam.

In another feature of this aspect, wherein one or more of the rear and front cross beams, the frame structure, the at least one extension bracket, and the projector mounting arm includes a steel material.

In another feature of this aspect, the projection system further includes a plurality of mounting brackets for securing the rear and front cross beams to a frame member of the sports enclosure, wherein each mounting bracket includes a main portion and a clamping portion that are securable to one another from opposite sides of the frame member. In another feature of this aspect, at least one of the main body and the clamping body includes an inwardly-projecting edge engageable against the frame member, the inwardly-projecting edge being defined by two inclined surfaces at sides of a flat interior surface.

Broadly defined, the present invention according to another aspect relates to a projection system for a sports enclosure. The projection system includes rear and front cross beams, each of which is mountable at opposite sides of a sports enclosure. The projection system further includes a frame structure mounted to the rear and front cross beams, at least one hooking bracket having a hook portion that is received within a channel of the rear cross beam, at least one extension bracket secured to each of the frame structure and the front cross beam, and a projector mounting arm mounted to the at least one extension bracket and extending forwardly therefrom. The projector mounting arm is pivotable relative to the at least one extension bracket to facilitate adjustment of an elevation of a projector and includes a pair of channels for retaining a slide assembly that supports the projector. The slide assembly is slidable within the channels to facilitate front-to-back adjustment of the projector.

In a feature of this aspect, the elevation of the projector is established by a repositionable locking pin upon which the projector mounting arm rests.

In another feature of this aspect, the projection system further includes a plurality of mounting brackets for securing the rear and front cross beams to a frame member of the sports enclosure, wherein each mounting bracket includes a main portion and a clamping portion that are securable to one another from opposite sides of the frame member. In another feature of this aspect, at least one of the main body and the clamping body includes an inwardly-projecting edge engageable against the frame member, the inwardly-projecting edge being defined by two inclined surfaces at sides of a flat interior surface.

In another feature of this aspect, the repositionable locking pin is received through an aperture of the at least one extension bracket.

In another feature of this aspect, the at least one extension bracket includes a hook portion that is received within a channel of the front cross beam.

In another feature of this aspect, wherein one or more of the rear and front cross beams, the frame structure, the at least one extension bracket, and the projector mounting arm includes a steel material.

Broadly defined, the present invention according to another aspect relates to a projector mount assembly for a sports enclosure substantially as shown and described.

Broadly defined, the present invention according to another aspect relates to a projection system for a sports enclosure substantially as shown and described.

Broadly defined, the present invention according to another aspect relates to a method of adjusting an elevation of a projector for a sports enclosure substantially as shown and described.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
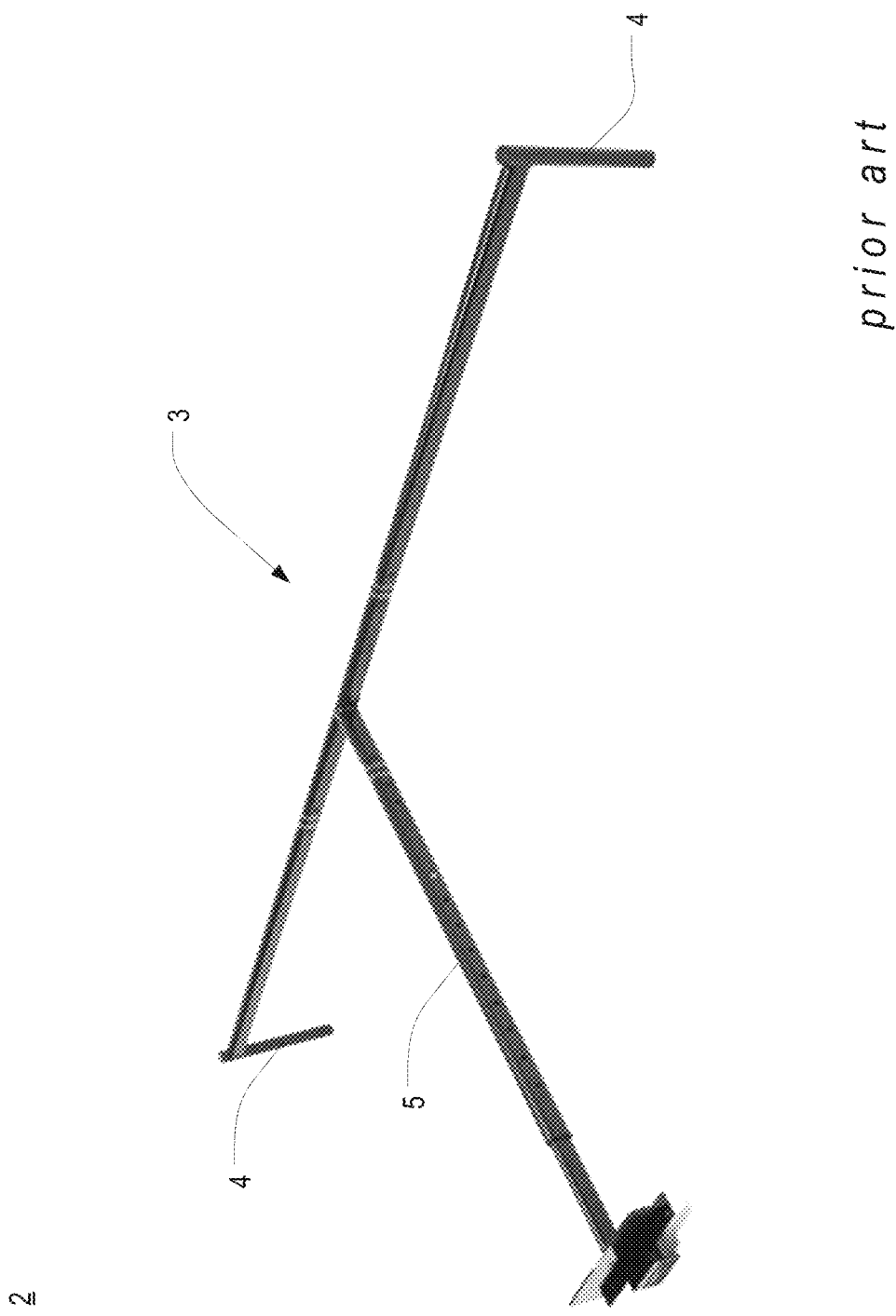
FIGS. 1 and 2 are perspective views of prior art projector mount assemblies for sports enclosures.
Figure 2:
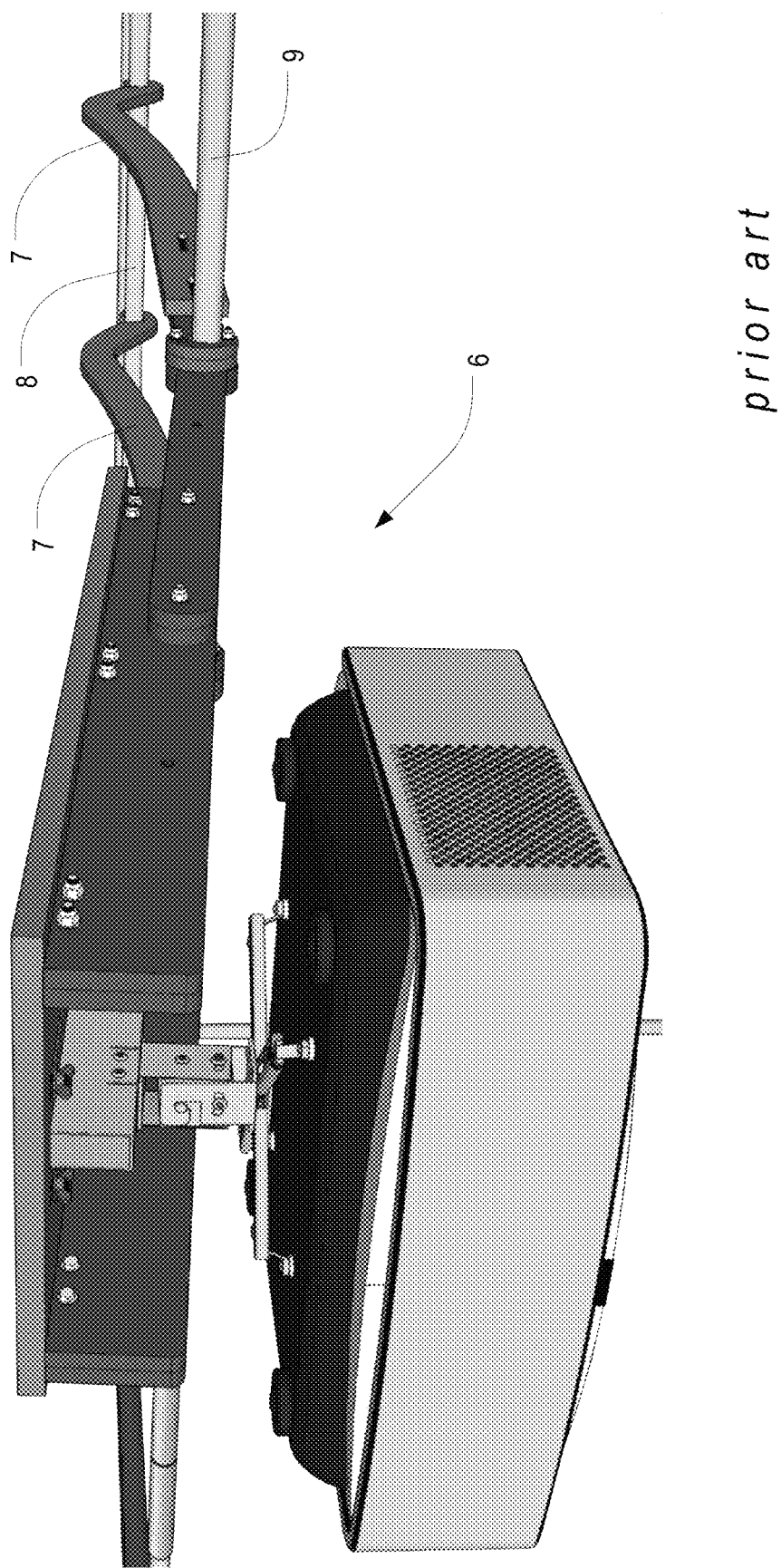

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 3:
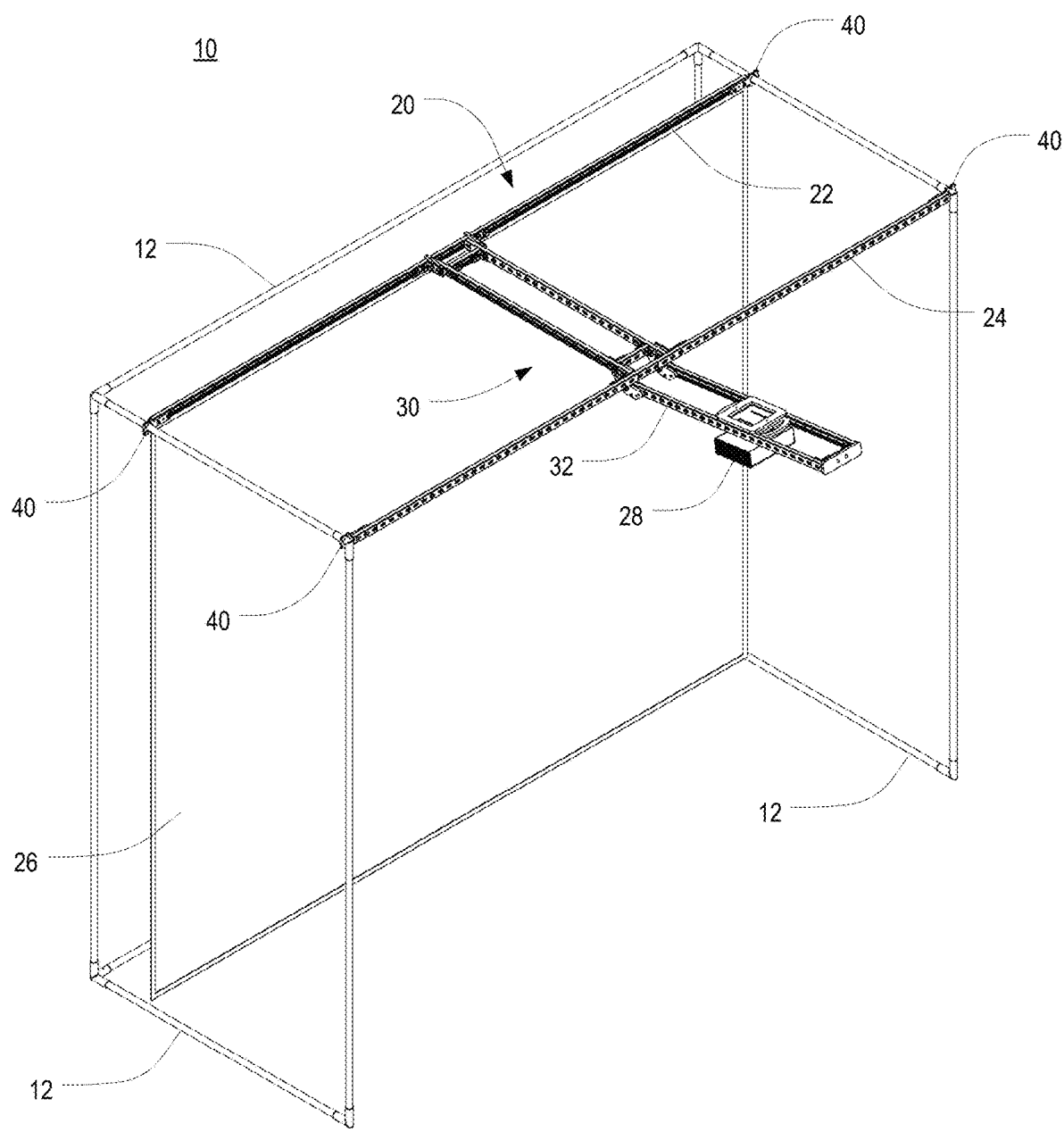
FIG. 3 is a top isometric view of a projection system mounted in a sports enclosure in accordance with one or more preferred embodiments of the present invention.

FIG. 3 is a top isometric view of a projection system 20 mounted in a sports enclosure 10 in accordance with one or more preferred embodiments of the present invention. The sports enclosure 10 includes a frame structure 12 and protective netting or the like (not shown). As shown in FIG. 3, the frame structure 12 is formed from interconnected horizontal and vertical frame members, which, when combined with protective netting, provides an enclosed or at least semi-enclosed space within which a sport or other activity can be practiced or coached. The projection system 20 includes a pair of cross members 22, 24 arranged at or near the top of the enclosure 10, the rearmost of which supports a projection screen 26, although in other embodiments the projection screen may be separately supported. In at least some embodiments, it is contemplated that the projection screen 26 is adjustable toward the front or the rear of the enclosure 10. Furthermore, it is contemplated that the cross members 22, 24 may be structurally identical to one another.

Figure 4:
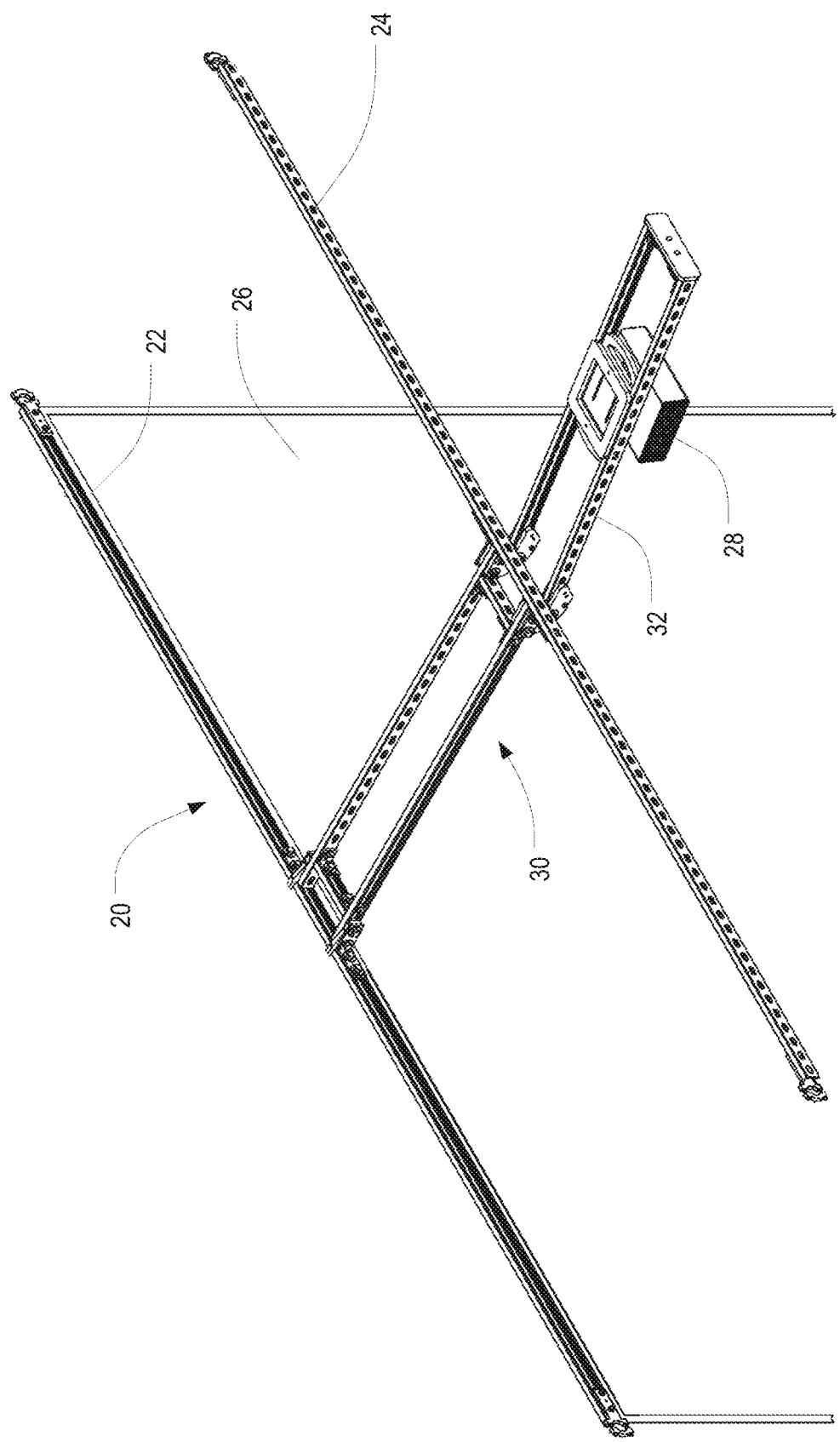
FIG. 4 is a top isometric view of the projection system and screen of FIG. 3.
Figure 5:
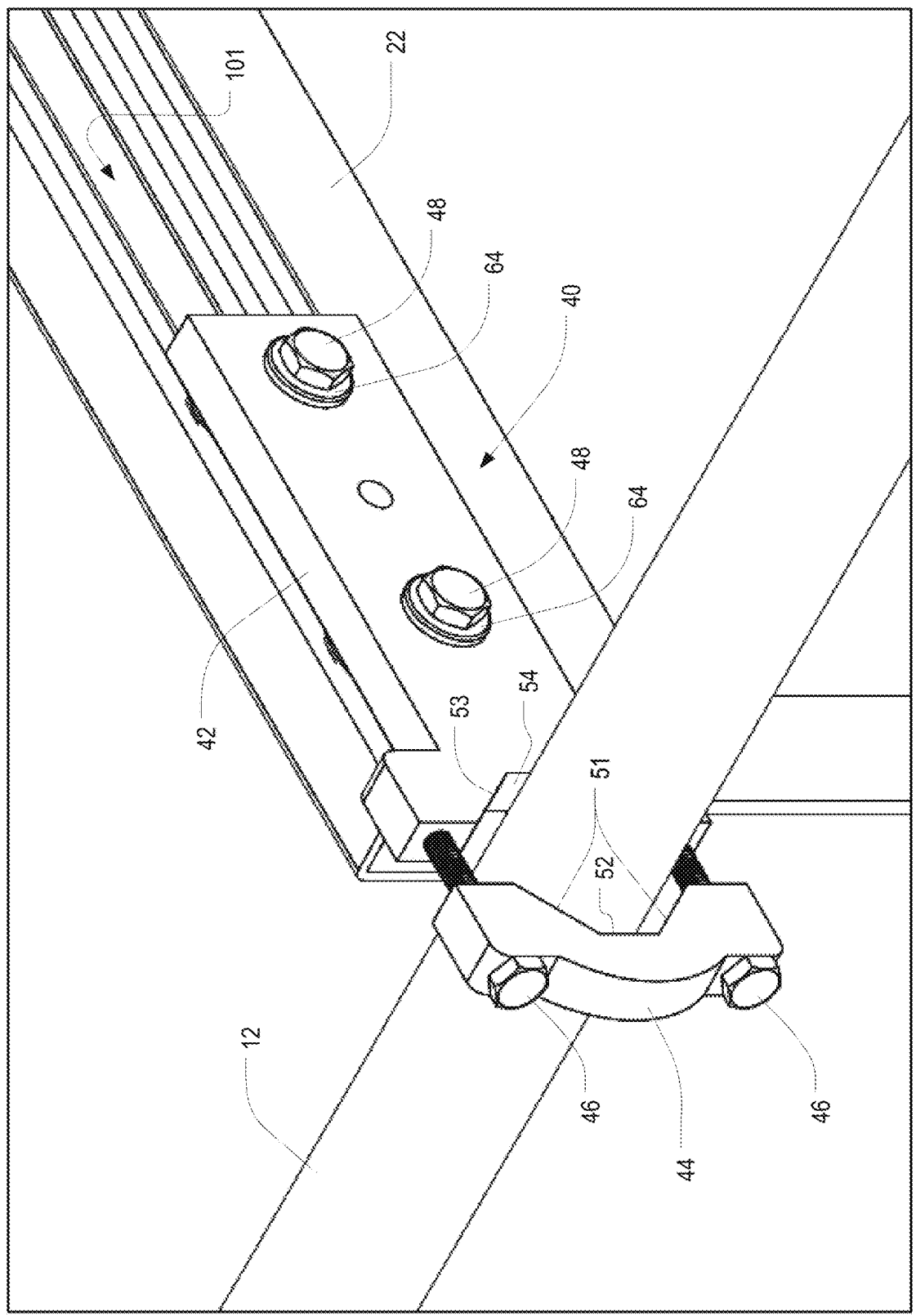
FIG. 5 is an enlarged fragmentary top isometric view of one of the mounting brackets of FIG. 3.
Figure 6:
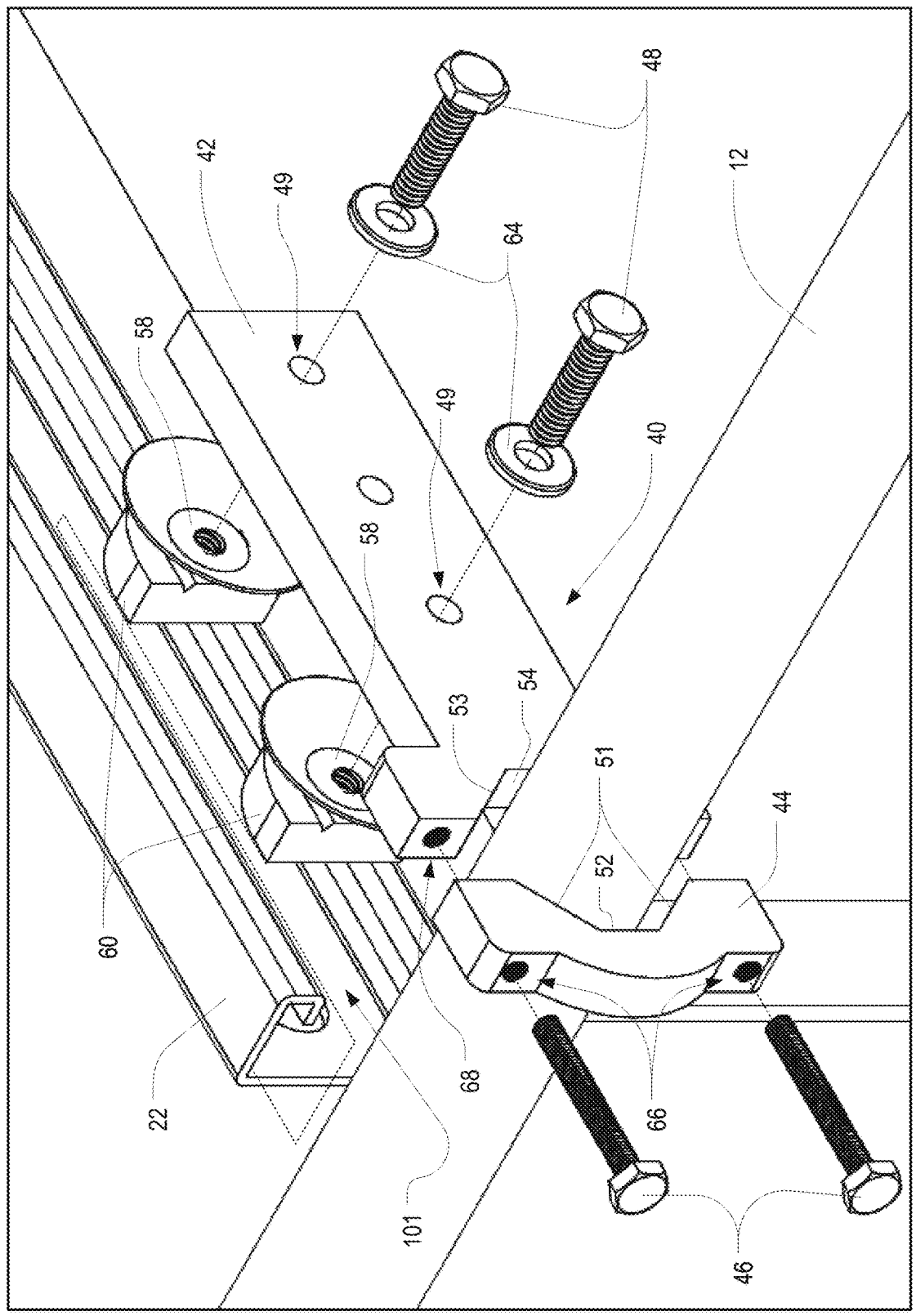
FIG. 6 is an exploded fragmentary top perspective view of the mounting bracket of FIG. 5.

FIG. 4 is a top isometric view of the projection system 20 and screen 26 of FIG. 3. The projection system 20 includes a projector 28 supported by a projector mount assembly 30, which in turn is supported by the cross members 22, 24. The cross members 22, 24 are attached at each end to a member of the frame structure 12 via mounting bracket assemblies 40 (see FIG. 3). In this regard, FIG. 5 is an enlarged fragmentary top isometric view of one of the mounting bracket assemblies 40 of FIG. 3, and FIG. 6 is an exploded fragmentary top perspective view of the mounting bracket assembly 40 of FIG. 5. It is contemplated that the cross members 22 can be manufactured from a variety of different durable materials, and, in at least some embodiments, the cross members 22 are roll-formed steel struts. Each cross member 22, 24 includes an interior channel 101, 102, adapted to receive and retain a channel nut, and a row of slot-shaped apertures arranged along a rear wall.

With reference to FIGS. 5 and 6, each mounting bracket assembly 40 includes a main body 42 and a clamping body 44 that are securable to one another from opposite sides of a member of the frame structure 12. Although the mounting bracket assembly 40 shown in FIG. 5 is attached to the rear cross member 22, it is contemplated that mounting bracket assemblies that are secured to the front cross member may have the same structure. In contemplated embodiments, each of the main body 42 and the clamping body 44 is formed of steel or a similar material. It is further contemplated that hardware used for assembling and securing the mounting bracket assemblies 40 may be made a material that exhibits strength and durability.

With further reference to FIGS. 5 and 6, threaded fastening bolts 48 are positioned through washers 64 and through apertures 49 in the main body 42. Each fastening bolt 48 is then received at a corresponding channel nut 58 at the opposite side of the main body 42. Each channel nut 58 includes an oblong end 60 that is received within the channel 101 of the rear cross member 22. Rotation of the channel nut 58 by approximately one quarter turn in either direction configures the nut 58 so that the oblong end 60 is obstructed from removal from the channel 101. In this manner, the fastening bolts 48 secure the main body 42 of the mounting bracket assembly 40 to the rear cross member 22.

Surfaces of the main body 42 and the clamping body 44 that engage the frame structure 12 are shaped to receive the cross-sectional shape of a member of the frame structure therebetween. In this regard, it is contemplated that each of the main body 42 and the clamping body 44 includes an inwardly-projecting edge defined by two inclined surfaces 51, 53 at sides of a flat interior surface 52, 54. In this regard, the mounting bracket assembly 40 is not restricted to use in connection with any specific type of frame structure. Rather, the inclined surfaces 51, 53 (as compared with strict round surfaces) facilitate attachment of the main body 42 and the clamping body 44 around the cross-sectional shape of tubing or frame structures of various diameters or shapes. As shown in FIG. 6, threaded fastening bolts 46 are received through apertures 66 in the clamping body and are received through corresponding apertures 68 in the main body, where they are tightened to secure the mounting bracket assembly 40 to the frame structure 12. As shown in FIG. 5, the threaded fastening bolts 46 have length sufficient to accommodate the cross-sectional shape of tubing or frame structures of various diameters or shapes.

Figure 7:
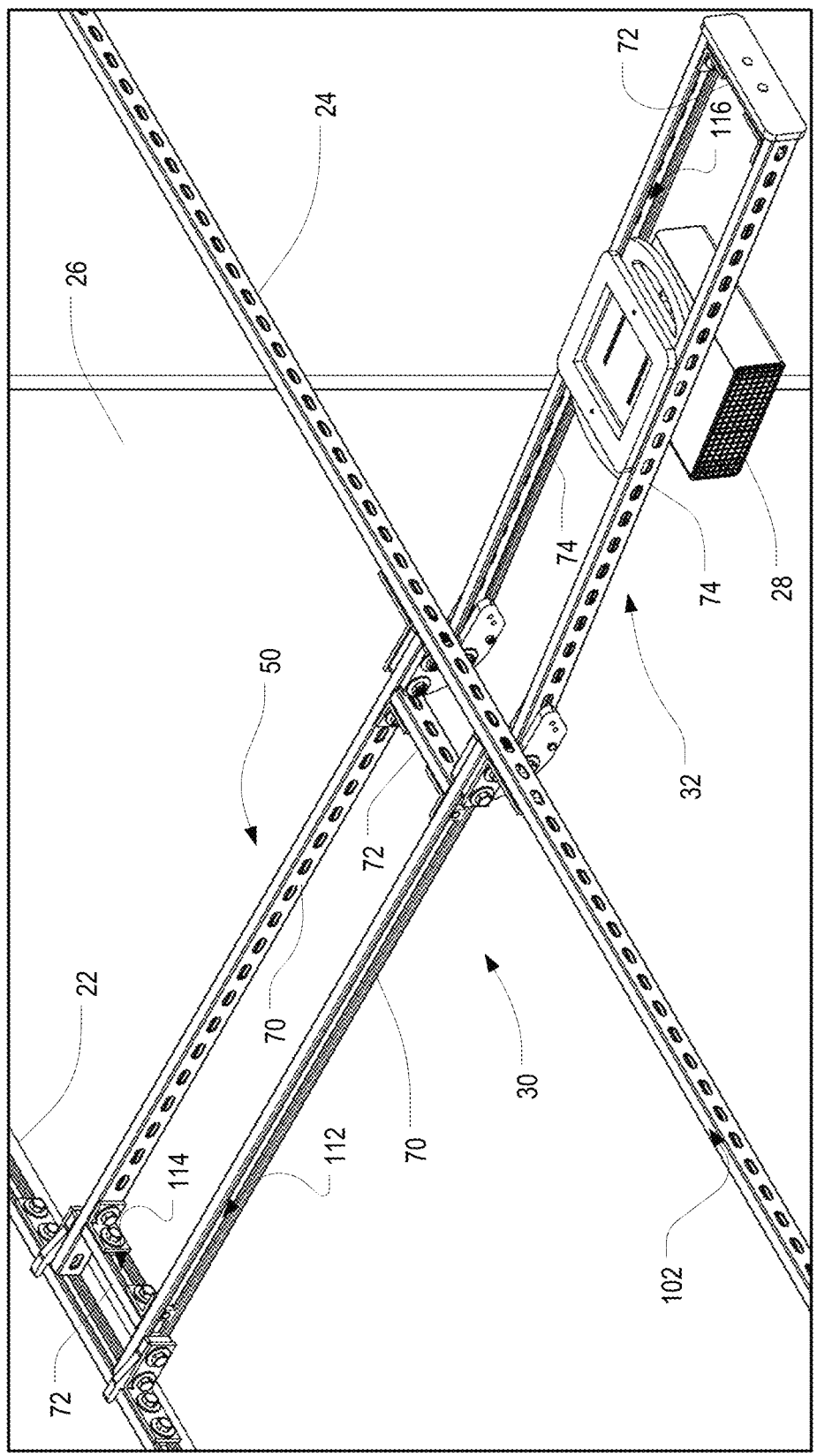
FIG. 7 is an enlarged fragmentary top isometric view of the projector mount assembly and projector of FIG. 3.
Figure 8:
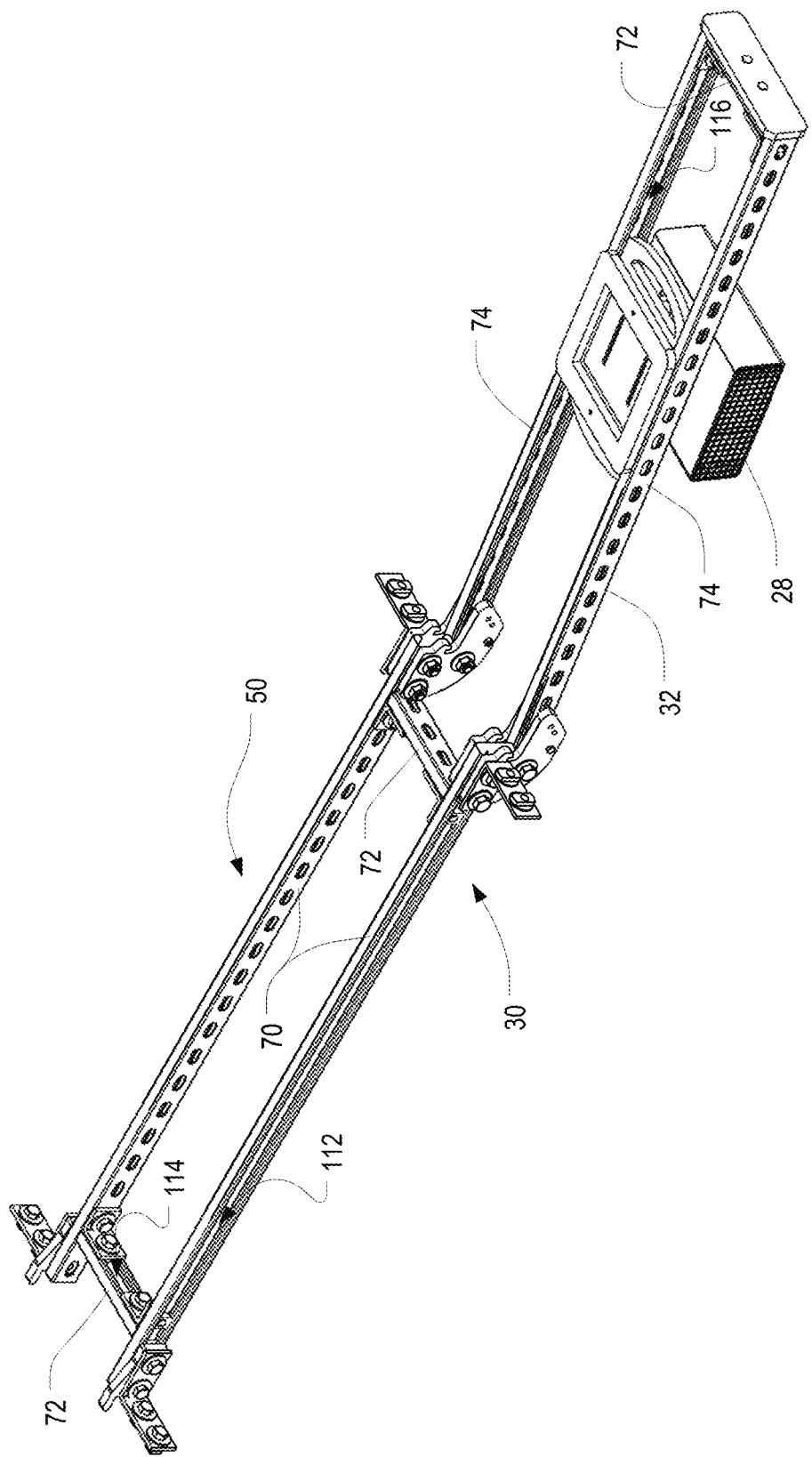
FIG. 8 is a top isometric view of the projector mount assembly and projector of FIG. 7, shown in isolation.

FIG. 7 is an enlarged fragmentary top isometric view of the projector mount assembly 30 and projector 28 of FIG. 3, and FIG. 8 is a top isometric view of the projector mount assembly 30 and projector 28 of FIG. 7, shown in isolation. The projector mount assembly 30 is supported at a rear portion thereof by the rear cross member 22, and at a central portion thereof by the front cross member 24. The projector 28 is itself carried on a projector mounting arm 32 extending forward from the front cross member 24. The projector 28 is maneuverable along the projector mounting arm 32 in both a forward and rearward direction, and the projector mounting arm 32 is itself maneuverable in a vertical direction to adjust an elevation of the projector 28.

In at least some contemplated embodiments, the projector mount assembly 30 includes a plurality of interconnected struts, including two rear struts 70, three cross struts 72, and two front struts 74. It is contemplated that the struts 70, 72, 74 can be manufactured from a variety of different sturdy or durable materials, and, in at least some embodiments, the struts are roll-formed steel struts. Furthermore, it is contemplated that each of the rear struts 70 may be structurally identical to one another, each of the cross struts 72 may be structurally identical to one another, and each of the forward struts may be structurally identical to one another. Each strut 70, 72, 74 includes an interior channel 112, 114, 116 adapted to receive and retain a channel nut, and a row of slot-shaped apertures arranged along a rear wall. A combination of fastening bolts, brackets, and channel nuts operate to secure the projector mount assembly 30 in an assembled state and to secure the projector mount assembly 30 to the cross members 22, 24, as will be explained in greater detail below. The hardware, including fastening bolts, brackets, and channel nuts, is adaptable to secure the projector mount assembly 30 into a variety of different types of sports enclosures. The nature of the materials used to form the struts 70, 72, 74 and the accompanying hardware is such that the fully fastened projector mount assembly 30 exhibits strength and durability and is capable of withstanding heavy loads mounted thereon (to at least substantially eliminate deformation, including bowing or flexing of the frame).

Figure 9:
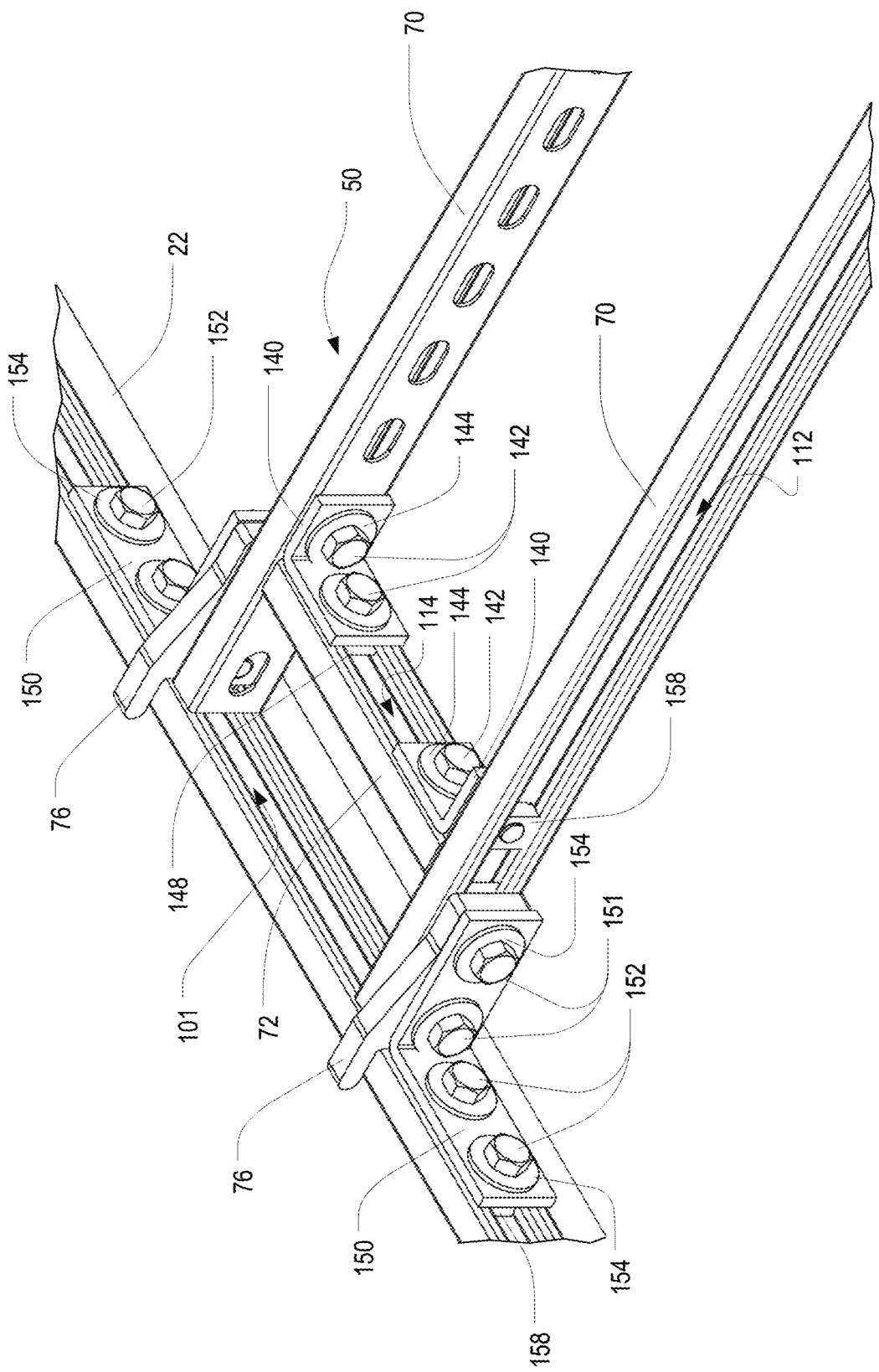
FIG. 9 is an enlarged fragmentary top isometric view of a rear portion of the projector mount assembly of FIG. 7.
Figure 10:
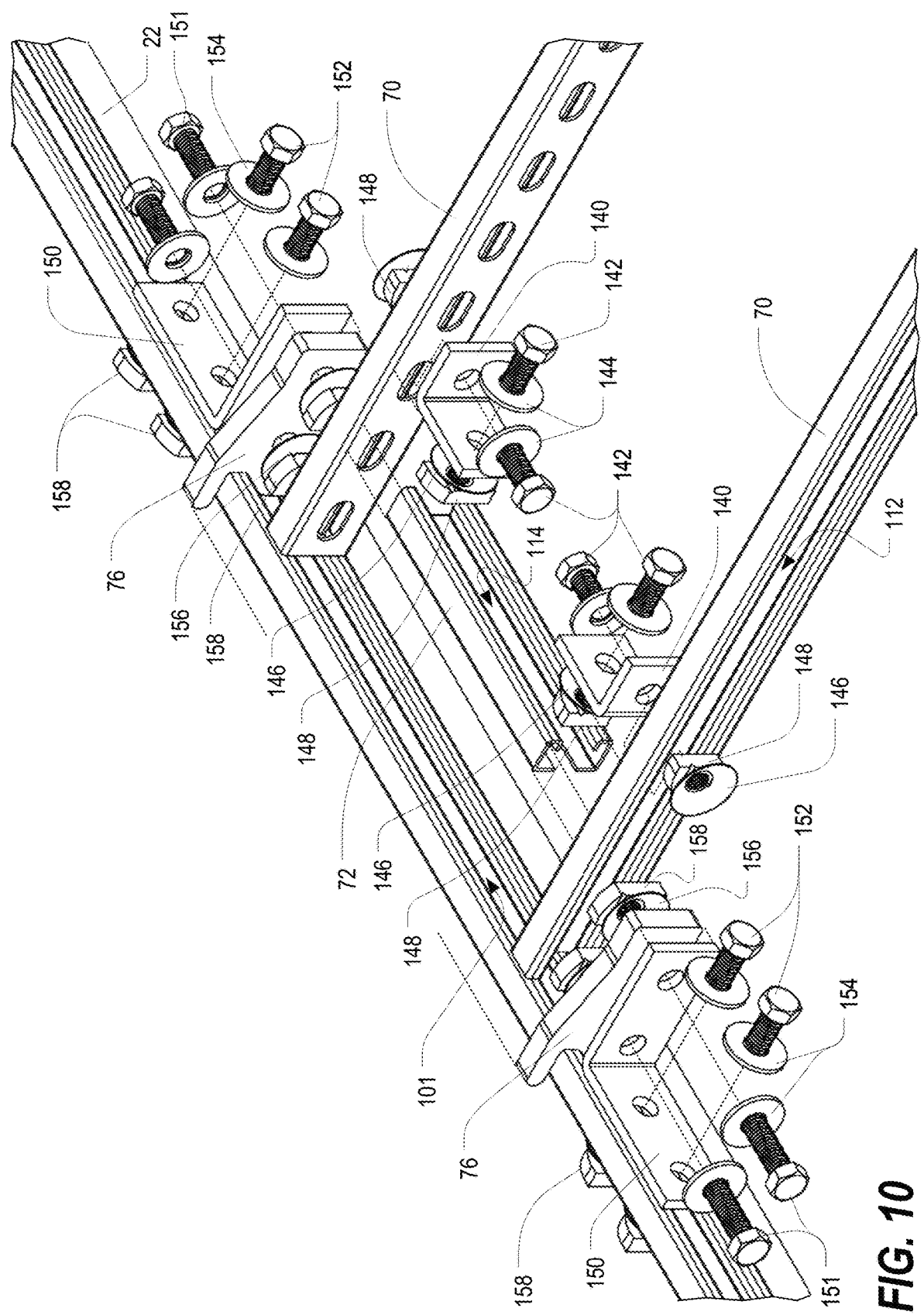
FIG. 10 is an exploded top isometric view of the rear portion of the projector mount assembly of FIG. 9.
Figure 11:
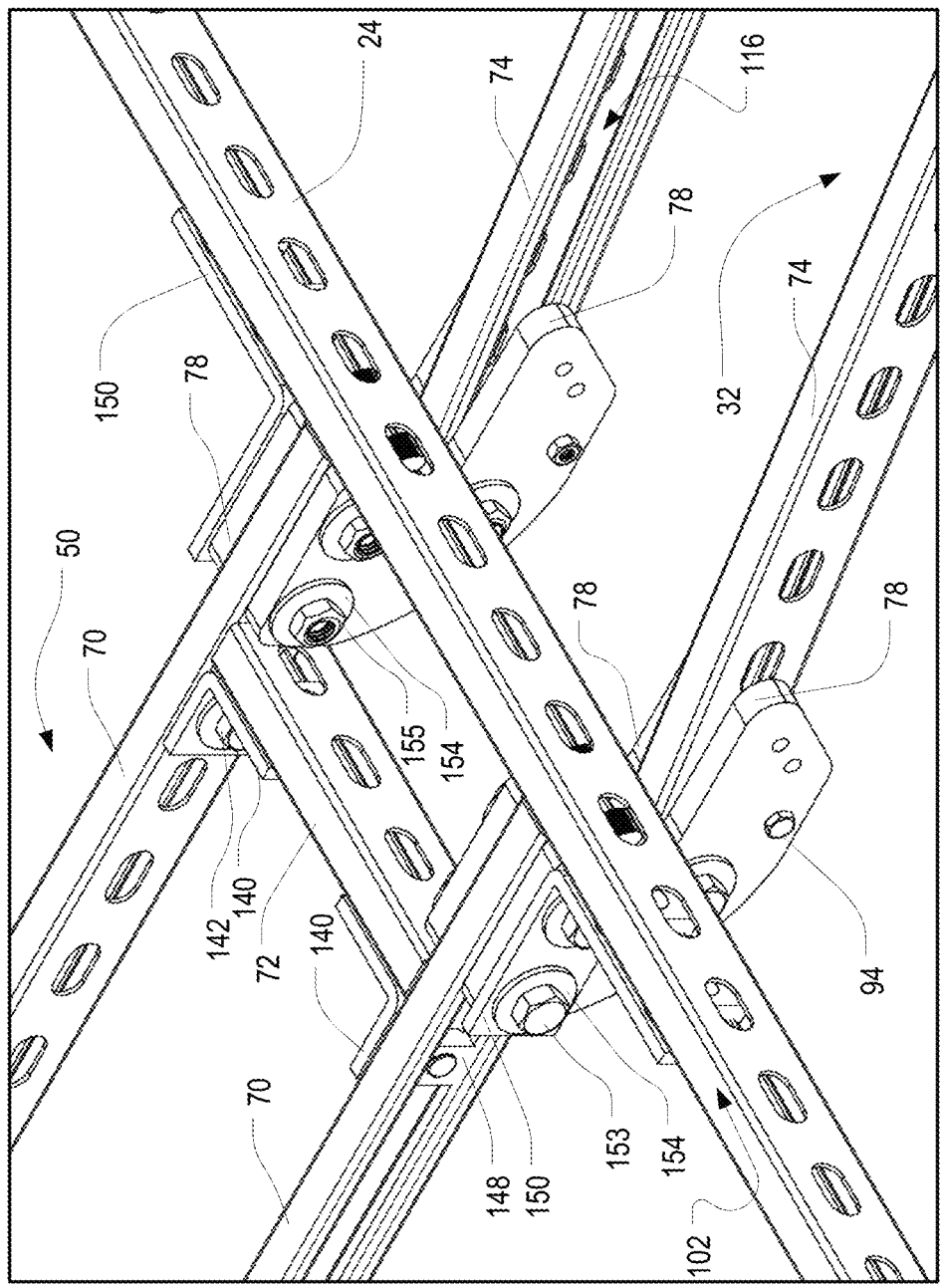
FIG. 11 is an enlarged fragmentary top isometric view of a central portion of the projector mount assembly of FIG. 7.
Figure 12:
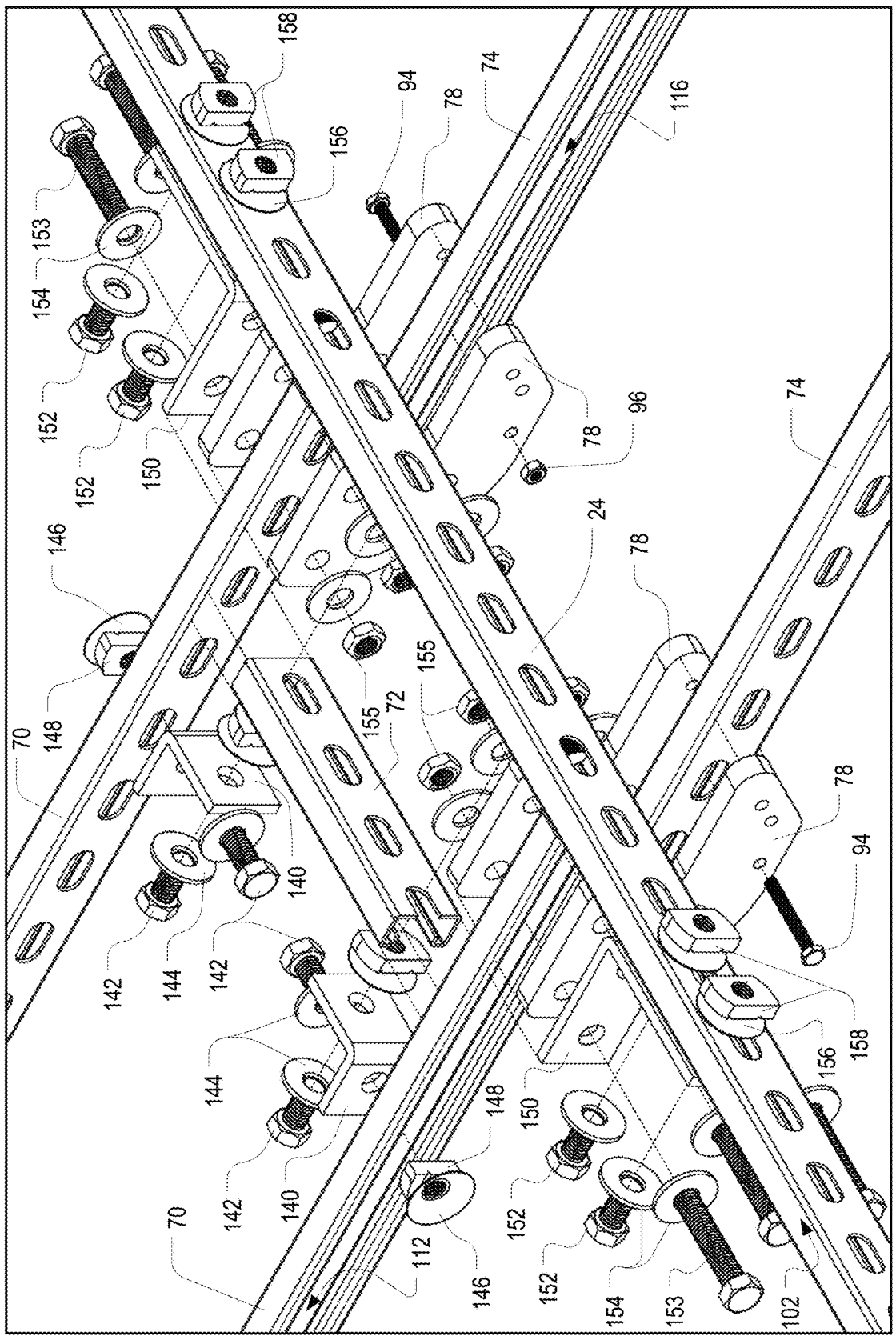
FIG. 12 is an exploded top isometric view of the central portion of the projector mount assembly of FIG. 11.

FIG. 9 is an enlarged fragmentary top isometric view of a rear portion of the projector mount assembly 30 of FIG. 7, and FIG. 10 is an exploded top isometric view of the rear portion of the projector mount assembly 30 of FIG. 9. Additionally, FIG. 11 is an enlarged fragmentary top isometric view of a central portion of the projector mount assembly 30 of FIG. 7, and FIG. 12 is an exploded top isometric view of the central portion of the projector mount assembly 30 of FIG. 11. With reference to FIGS. 9-12, two of the cross struts 72 and the rear struts 70 are interconnected to form a rear frame 50 that is mounted to each of the front and rear cross members 22, 24. In particular, the cross struts 72 are arranged such that the interior channels 114 face one another, and the rear struts 70 are arranged such that the interior channels 112 face away from one another. Angle brackets 140 are mounted to the cross struts 72 and the rear struts 70 using threaded fastening bolts 142, washers 144, and channel nuts 146. Each channel nut 146 includes an oblong end 148 that is received within the channel 112, 114 of the strut 70, 72 to which the corresponding fastening bolt 142 is directed. Rotation of the channel nut 146 by approximately one quarter turn in either direction configures the nut 146 so that the oblong end 148 is obstructed from removal from the channel 112, 114. In this manner, the fastening bolts 142 secure the angle brackets 140 to the struts 70, 72 and, thereby, the struts 70, 72 to one another.

With further reference to FIGS. 9-12, angle brackets 150 are mounted to the rear struts 70 and each of the front and rear cross members 22, 24 using threaded fastening bolts 151, 152, 153, washers 154, threaded fastening nuts 155, and channel nuts 156. At the rear of the rear frame 50, hooking brackets 76 are positioned between the angle bracket 150 and the rear struts 70. Additionally, at the front of the rear frame 50, extension brackets 78 are positioned between the angle bracket 150 and the rear struts 70 as well as at the other side of the rear struts 70. It is contemplated that the fastening bolts 151 used to secure the hooking brackets 76 and the fastening bolts 153 used to secure the extension brackets 78 have a longer bolt shaft to accommodate the thickness of the brackets 76, 78. Each channel nut 156 includes an oblong end 158 that is received within the channel 112 of the strut 70 or the channel 101, 102 of the cross member 22, 24 to which the corresponding fastening bolt 151, 152 is directed. Rotation of the channel nut 156 by approximately one quarter turn in either direction configures the nut 156 so that the oblong end 158 is obstructed from removal from the channel 112, 101, 102. In this manner, the fastening bolts 151 secure the angle brackets 150 and the hooking brackets 76 to the rear struts 70, and the fastening bolts 152 secure the angle brackets 150 to the cross members 22,24. Additionally, with respect to the extension brackets 78, it is contemplated that, in lieu of channel nuts, threaded fastening nuts 155 may be arranged at the distal ends of the bolt shafts to securely retain the fastening bolts 153 and the extension brackets 78 together. And, in this manner, the fastening bolts 153 and fastening nuts 155 secure the angle brackets 150 and extension brackets 78 to the rear struts 70.

Figure 13:
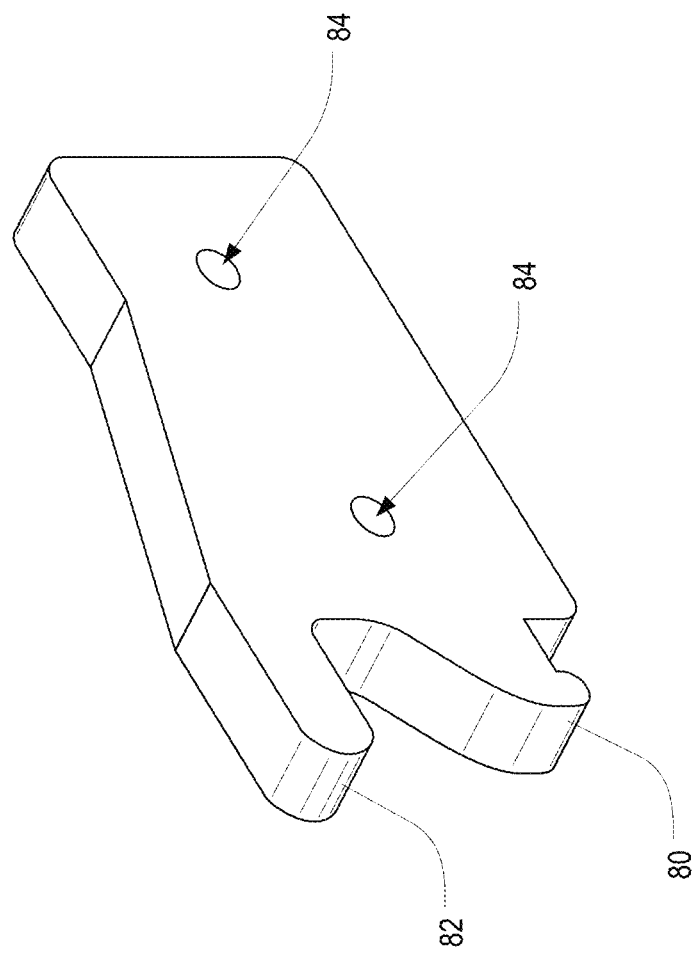
FIG. 13 is an orthogonal view of one of the hooking brackets of FIG. 9, shown in isolation.

FIG. 13 is an orthogonal view of one of the hooking brackets 76 of FIG. 9, shown in isolation. The hooking brackets 76 help to facilitate securement and retention of the projector mount assembly 30 to the rear cross members 22. With reference to FIG. 13, each hooking bracket 76 includes a hook portion 80 and a ledge portion 82 that engage with the rear cross member 22. In particular, and with additional reference to FIGS. 9 and 10, the hook portion 80 of each hooking bracket 76 is seated within the interior channel 101 to brace the projector mount assembly 30 against the rear cross member 22. Additionally, each ledge portion 82 rests against or adjacent to a top surface of the rear cross member 22 to help properly align the hooking brackets 76 with the rear cross member 22. Apertures 84 in the hooking brackets 76 receive the fastening bolts 151 therethrough to facilitate securement of the hooking brackets 76 against the rear struts 70. Although two hooking brackets 76 are depicted in FIGS. 9 and 10, it is contemplated that the projector mount assembly 30 may include more or fewer hooking brackets 76.

Figure 14:
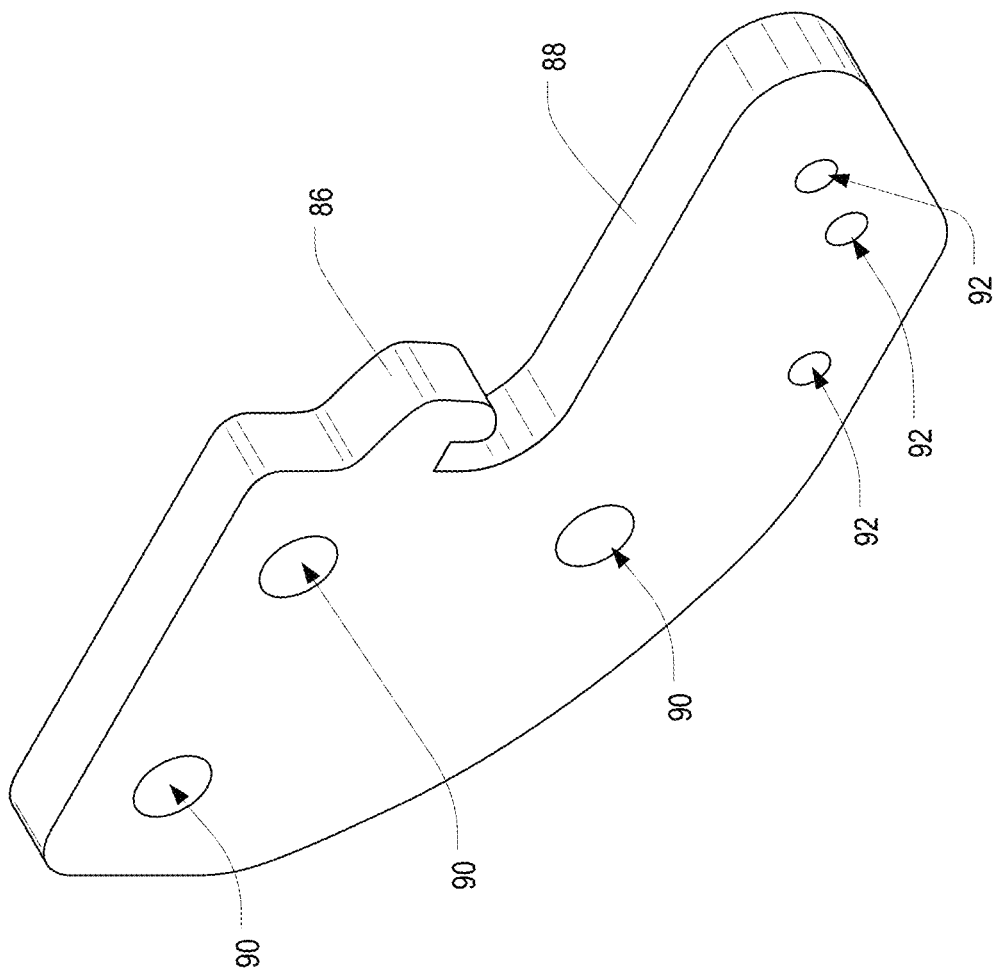
FIG. 14 is an orthogonal view of one of the extension brackets of FIG. 11, shown in isolation.

FIG. 14 is an orthogonal view of one of the extension brackets 78 of FIG. 11, shown in isolation. With reference to FIGS. 11, 12, and 14, each extension bracket 78 includes a hook portion 86 that is received within the interior channel 102 of the front cross member 24 to brace the projector mount assembly 30 against the front cross member 24. Additionally, each extension bracket 78 includes an extension portion 88 that extends beneath the front cross member 24 and is secured to the front struts 74 of the projector mount assembly 30 via fastening bolts 153, washers 154, and threaded fastening nuts 155. In this regard, the extension brackets 78 provide an indirect connection between the rear frame 50 and the projector mounting arm 32. Large apertures 90 in the extension brackets 78 receive the fastening bolts 153 therethrough to facilitate securement of the extension brackets 78 against the rear struts 70 and the front struts 74. Small apertures 92 in the extension brackets 78 are shaped to accommodate a locking pin 94 therethrough in order to facilitate adjustment of the projector arm 32, as will be discussed in greater detail below. Although four extension brackets 78 are depicted in FIGS. 11 and 12, it is contemplated that the projector mount assembly 30 may include more or fewer extension brackets 78.

Figure 15:
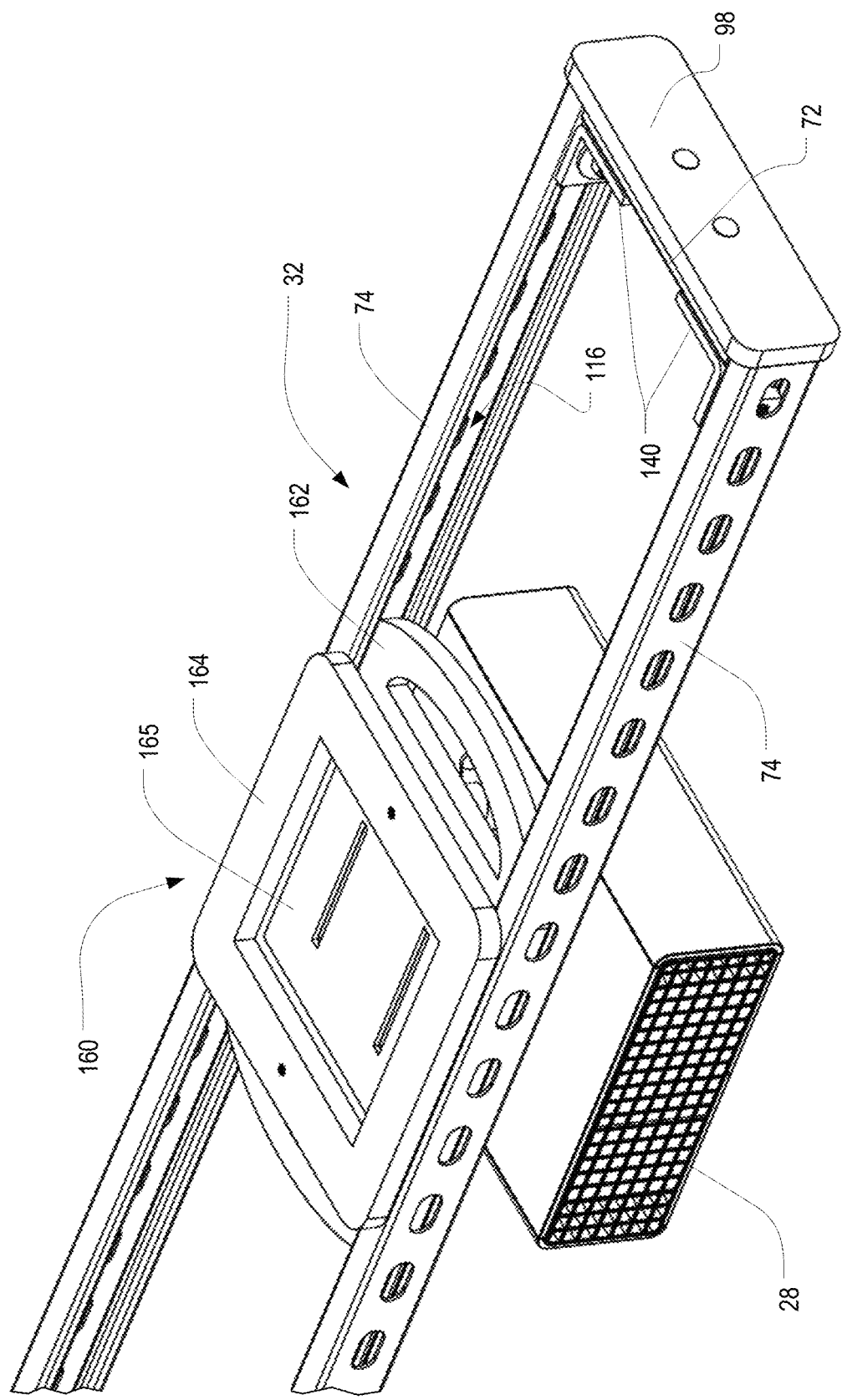
FIG. 15 is an enlarged fragmentary top isometric view of a front portion of the projector mount assembly of FIG. 7.
Figure 16:
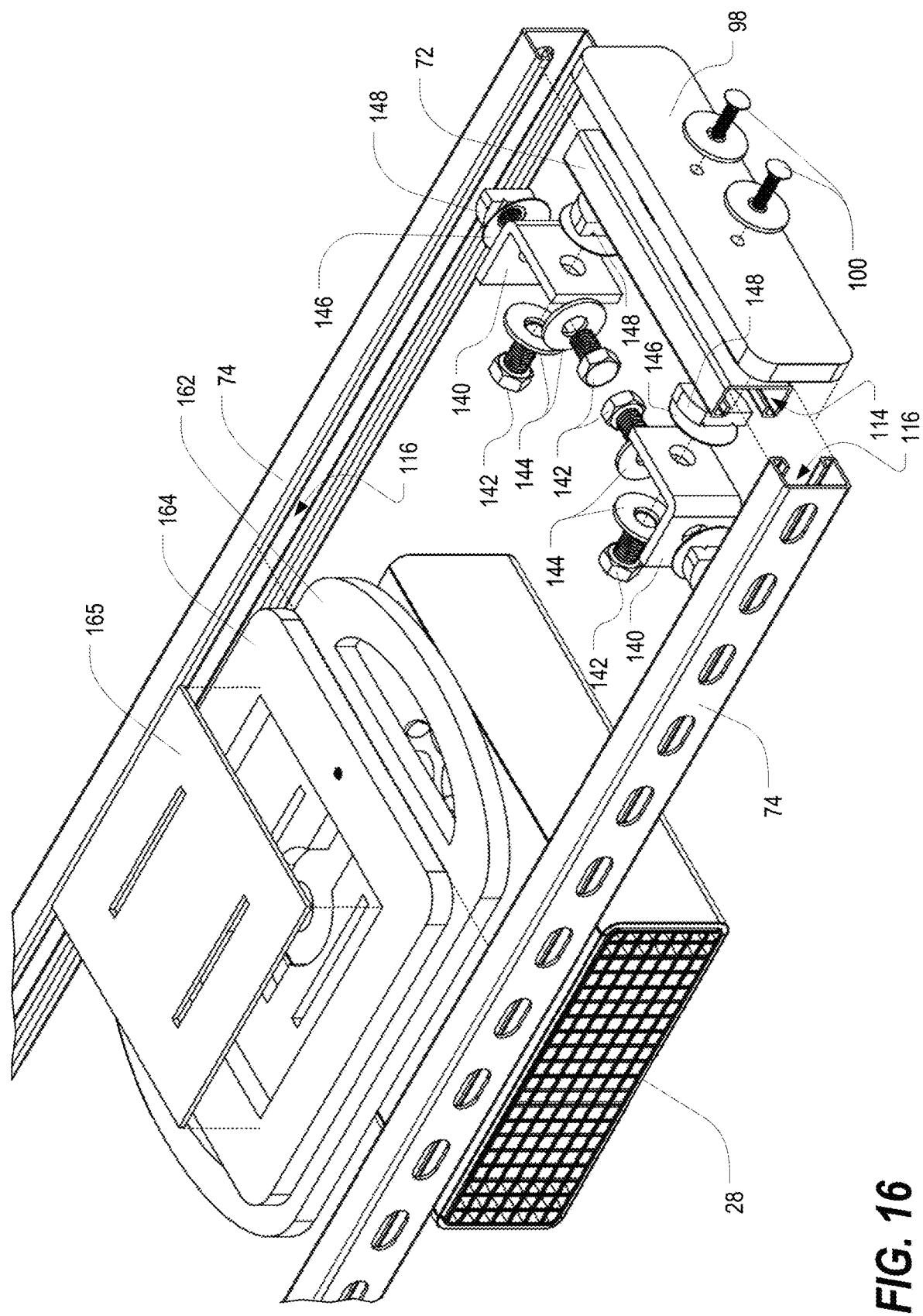
FIG. 16 is an exploded orthogonal view of the front portion of the projector mount assembly of FIG. 15.

FIG. 15 is an enlarged fragmentary top isometric view of a front portion of the projector mount assembly 30 of FIG. 7, and FIG. 16 is an exploded orthogonal view of the front portion of the projector mount assembly 30 of FIG. 15. The projector mounting arm 32 is formed from the front struts 74, each of which is mounted to a corresponding pair of extension brackets 78 at one end thereof and a cross strut 72 at the other end thereof. The cross strut 72 is secured to the front struts 74 with angle brackets 140 secured with fastening bolts 142, washers 144, and channel nuts 146. Each channel nut 146 includes an oblong end 148 that is received within the channel 114, 116 of the strut 72, 74 to which the corresponding fastening bolt 142 is directed. Rotation of the channel nut 146 by approximately one quarter turn in either direction configures the nut 146 so that the oblong end 148 is obstructed from removal from the channel 114, 116. In this manner, the fastening bolts 142 secure the angle brackets 140 to the struts 72, 74 and, thereby, the struts 72, 74 to one another. In at least some embodiments, an end plate 98 is fastened against the cross strut 72 at a distal end of the projector arm 32 with fastening bolts 100.

Figure 17:
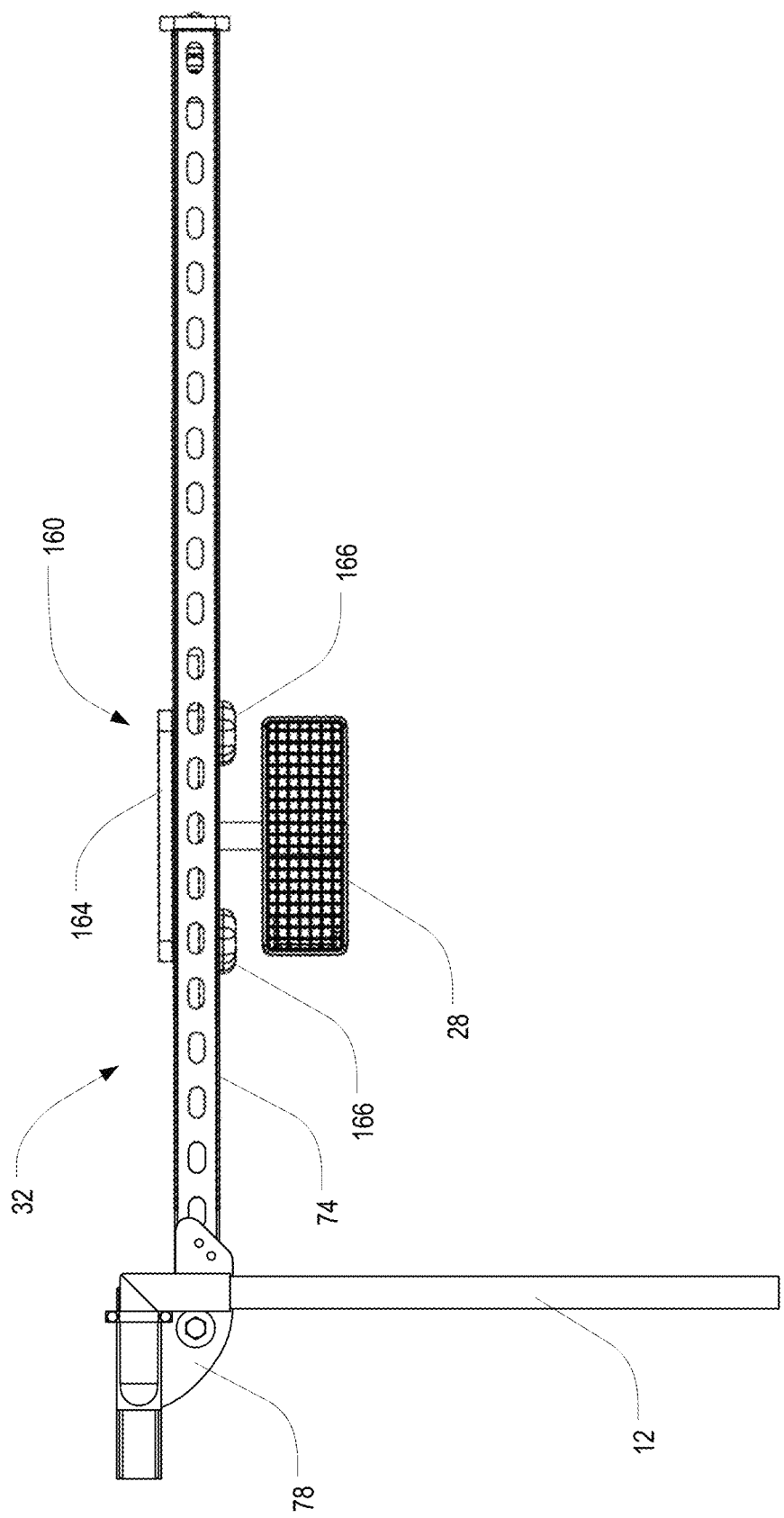
FIG. 17 is a fragmentary left side view of the projector mounting arm and projector of FIG. 7, shown in a horizontal and laterally-shifted position.

With further reference to FIGS. 15 and 16, the projector 28 is adjustably mounted to the projector arm 32 via a slide assembly 160. The slide assembly 160 includes a bottom plate 162 having lateral edges that are received within the interior channels 116 of the front struts 74 and further includes a top plate 164 that is arranged above the front struts 74. A support plate 165 for the projector 28 is arranged between the top and bottom plates 162, 164 of the slide assembly 160, and, in at least some embodiments, the support plate 165 is fastened to the bottom plate 162 of the slide assembly 160. The projector 28 is mounted to and extends downward from the support plate 165 beneath the projector mounting arm 32. In at least some embodiments, the top and bottom plates 162, 164 are secured to one another with threaded knobs 166 (best seen in FIGS. 17-19) that are fastened in place with nuts. Rotation of the knobs 166 in a tightening direction maneuvers the top and bottom plates 162,164 toward one another and clamps the slide assembly 160 to the front struts 74. When not fully tightened, the slide assembly 160 is capable of adjustment along the interior channels 116 of the front struts 74 to maneuver the projector 28 toward or away from the projection screen 26. In this regard, FIG. 17 is a fragmentary left side view of the projector mounting arm 32 and projector 28 of FIG. 7, shown in a horizontal and laterally-shifted position. If additional distance from the projection screen 26 is required, it is further contemplated that the front struts 74 can be replaced with struts having additional length.

Figure 18:
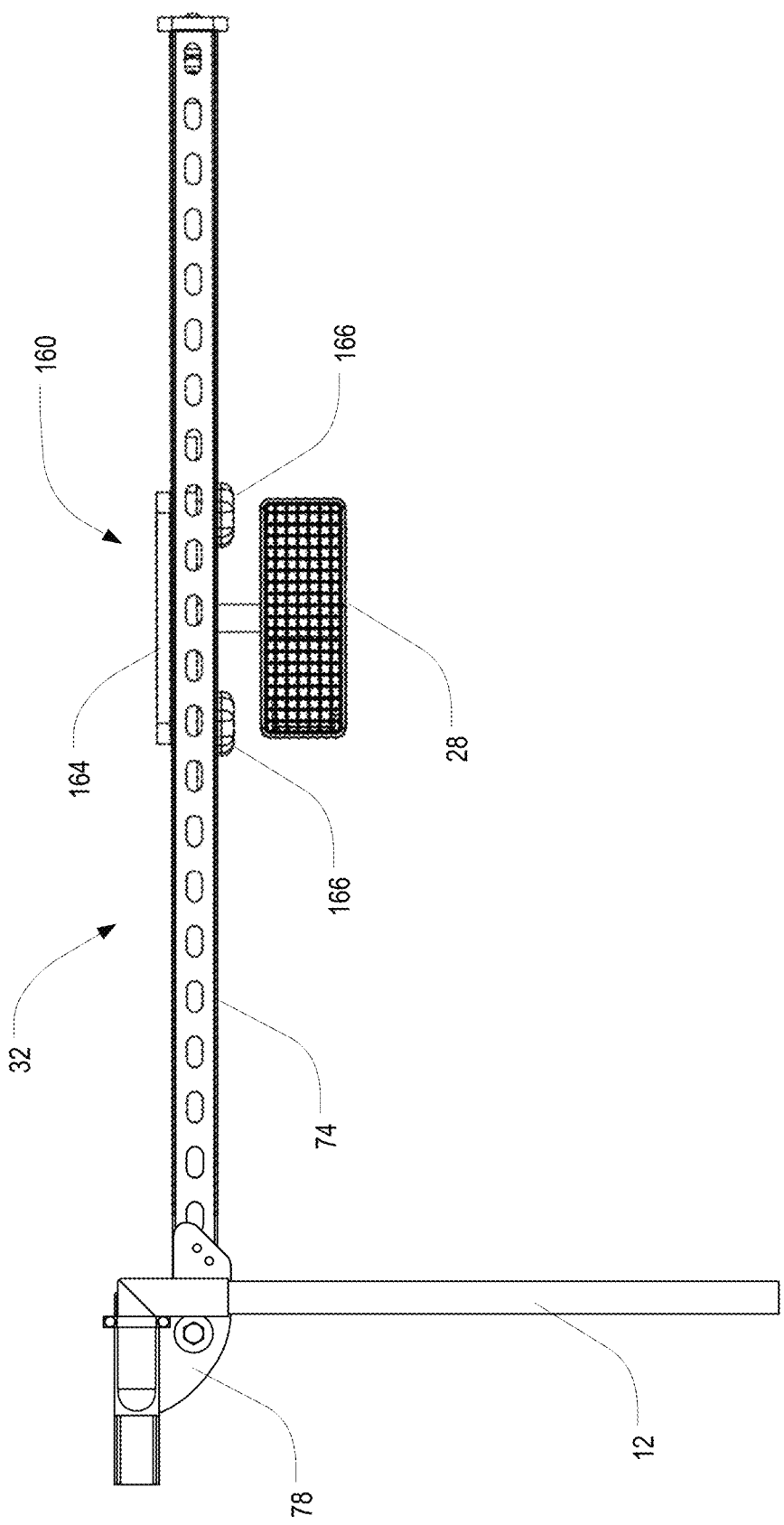
FIG. 18 is an enlarged fragmentary left side view of the projector mounting arm and projector of FIG. 7, shown in a horizontal position.
Figure 19:
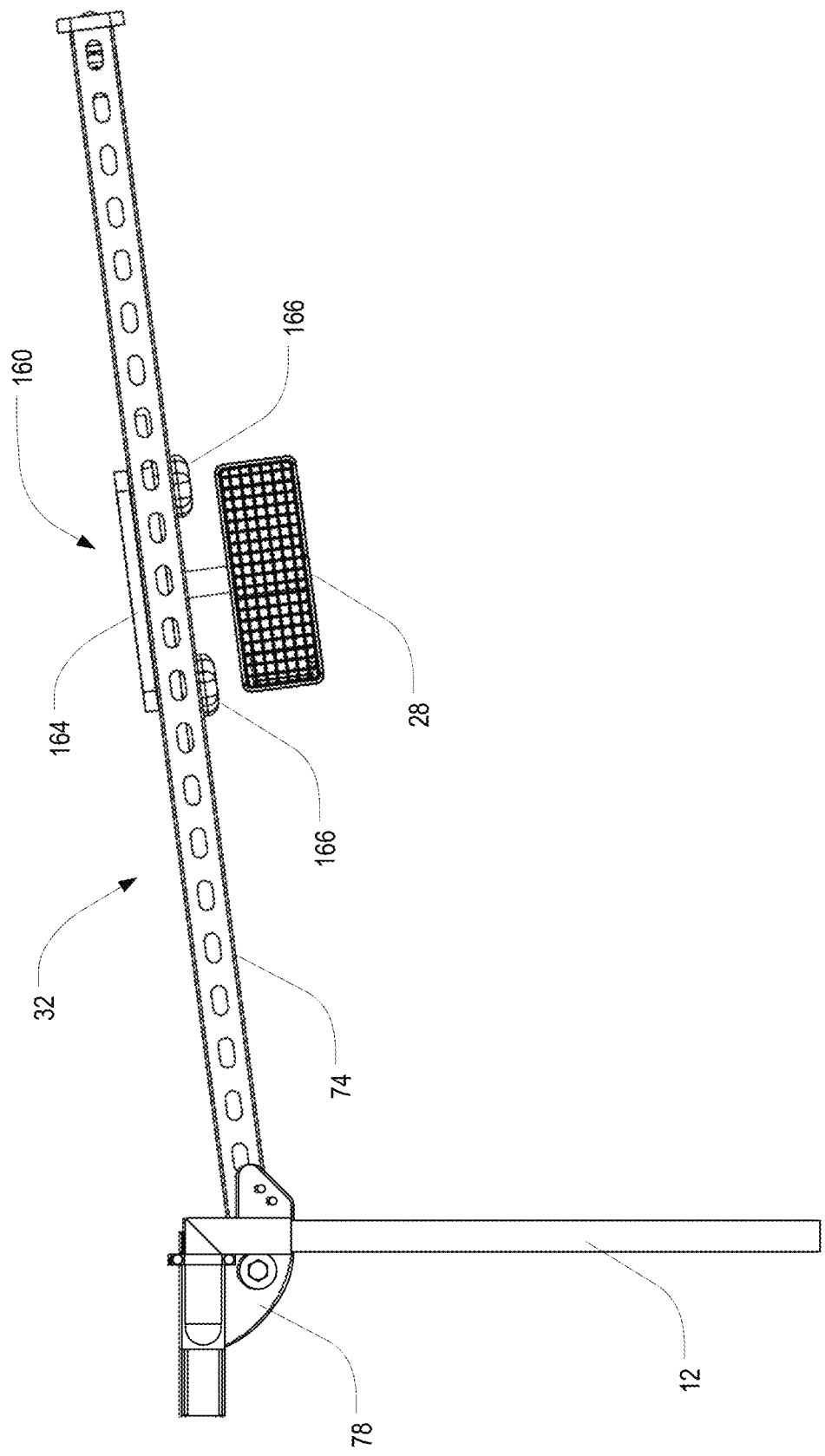
FIG. 19 is a fragmentary left side view of the projector mounting arm and projector of FIG. 18, shown in an elevated position.

The projector mounting arm 32 may be oriented at different angles. In this regard, FIG. 18 is an enlarged fragmentary left side view of the projector mounting arm 32 and projector 28 of FIG. 7, shown in a horizontal position, and FIG. 19 is a fragmentary left side view of the projector mounting arm 32 and projector 28 of FIG. 18, shown in an elevated position. With reference to FIGS. 11, 12, 14, 18, and 19, it is contemplated that locking pins 94 can be used to set the elevation of the projector mounting arm 32. As shown in FIG. 14, the extension brackets 78 include a plurality of apertures 92 that can accommodate the locking pins 94. When the locking pins 94 are positioned within corresponding apertures 92 of the extension brackets 78, the projector mounting arm 32 rests against the locking pins 94 and establishes a vertical elevation for the projector 28. The vertical elevation of the projector 28 can be adjusted by removing and repositioning the locking pins 94 through different corresponding 92 apertures of the extension brackets 78. In this regard, the projector 28 can be elevated to a safe distance above the enclosure 10.

The projector mount assembly 30 of the present invention is capable of attachment to sports enclosures of varying designs and configurations. Additionally, the projector mount assembly 30 of the present invention facilitates adjustment of projector height and distance relative to the projection screen 26 while avoiding structural deformation that might arise due to the weight of the projector 28. Features of the projector mount assembly 30 permit a selected position of the projector 28 to be fixed or locked so that the projector 28 remains stationary during the activity taking place inside the sports enclosure.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A projector mount assembly for a sports enclosure comprising:
   a frame structure mountable to rear and front cross beams of the sports enclosure;
   at least one extension bracket secured to the frame structure and mountable to the front cross beam; and
   a projector mounting arm mounted to the at least one extension bracket and extending forwardly therefrom, the projector mounting arm being adapted to support, and facilitate front-to-back adjustment of, a projector; wherein the projector mounting arm is pivotable relative to the at least one extension bracket to facilitate adjustment of an elevation of the projector; and
   wherein the at least one extension bracket includes a hook portion that is engageable with a channel of the front cross beam.

2. The projector mount assembly of claim 1, wherein the projector mounting arm includes a pair of channels for retaining a slide assembly that supports the projector.

3. The projector mount assembly of claim 2, wherein the slide assembly is slidable within the pair of channels.

4. The projector mount assembly of claim 1, wherein the elevation of the projector is established by a repositionable locking pin upon which the projector mounting arm rests.

5. The projector mount assembly of claim 4, wherein the repositionable locking pin is received through an aperture of the at least one extension bracket.

6. The projector mount assembly of claim 1, further comprising at least one hooking bracket having a hook portion that is engageable with a channel of the rear cross beam.

7. A projection system for a sports enclosure comprising:
   rear and front cross beams, each of which is mountable at opposite sides of the sports enclosure;
   a frame structure mounted to the rear and front cross beams;
   at least one extension bracket secured to each of the frame structure and the front cross beam;
   a projector mounting arm mounted to the at least one extension bracket and extending forwardly therefrom, the projector mounting arm being adapted to support, and facilitate front-to-back adjustment of, a projector; and
   at least one hooking bracket having a hook portion that is received within a channel of the rear cross beam;
   wherein the projector mounting arm is pivotable relative to the at least one extension bracket to facilitate adjustment of an elevation of the projector.

8. The projection system of claim 7, wherein the projector mounting arm includes a pair of channels for retaining a slide assembly that supports the projector.

9. The projection system of claim 8, wherein the slide assembly is slidable within the pair of channels.

10. The projection system of claim 7, wherein the elevation of the projector is established by a repositionable locking pin upon which the projector mounting arm rests.

11. The projection system of claim 10, wherein the repositionable locking pin is received through an aperture of the at least one extension bracket.

12. The projection system of claim 7, wherein the at least one extension bracket includes a hook portion that is received within a channel of the front cross beam.

13. A projection system for a sports enclosure comprising:
   rear and front cross beams, each of which is mountable at opposite sides of the sports enclosure;
   a frame structure mounted to the rear and front cross beams;
   at least one extension bracket secured to each of the frame structure and the front cross beam;
   a projector mounting arm mounted to the at least one extension bracket and extending forwardly therefrom, the projector mounting arm being adapted to support, and facilitate front-to-back adjustment of, a projector; and
   a plurality of mounting brackets for securing the rear and front cross beams to a frame member of the sports enclosure, wherein each mounting bracket includes a main portion and a clamping portion that are securable to one another from opposite sides of the frame member;

wherein the projector mounting arm is pivotable relative to the at least one extension bracket to facilitate adjustment of an elevation of the projector.

14. The projection system of claim 13, wherein at least one of the main body portion and the clamping portion includes an inwardly-projecting edge engageable against the frame member, the inwardly-projecting edge being defined by two inclined surfaces at sides of a flat interior surface.

15. The projection system of claim 13, wherein the projector mounting arm includes a pair of channels for retaining a slide assembly that supports the projector.

16. The projection system of claim 15, wherein the slide assembly is slidable within the pair of channels.

17. The projection system of claim 13, wherein the elevation of the projector is established by a repositionable locking pin upon which the projector mounting arm rests.

18. The projection system of claim 17, wherein the repositionable locking pin is received through an aperture of the at least one extension bracket.

19. The projection system of claim 13, wherein the at least one extension bracket includes a hook portion that is received within a channel of the front cross beam.

20. A projection system for a sports enclosure comprising:
rear and front cross beams, each of which is mountable at opposite sides of a sports enclosure;
a frame structure mounted to the rear and front cross beams;
at least one hooking bracket having a hook portion that is received within a channel of the rear cross beam;
at least one extension bracket secured to each of the frame structure and the front cross beam; and
a projector mounting arm mounted to the at least one extension bracket and extending forwardly therefrom, wherein,
the projector mounting arm is pivotable relative to the at least one extension bracket to facilitate adjustment of an elevation of a projector,
the projector mounting arm includes a pair of channels for retaining a slide assembly that supports the projector, and
the slide assembly is slidable within the pair of channels to facilitate front-to-back adjustment of the projector.

21. The projection system of claim 20, wherein the elevation of the projector is established by a repositionable locking pin upon which the projector mounting arm rests.

22. The projection system of claim 20, further comprising a plurality of mounting brackets for securing the rear and front cross beams to a frame member of the sports enclosure, wherein each mounting bracket includes a main portion and a clamping portion that are securable to one another from opposite sides of the frame member.

23. The projection system of claim 22, wherein at least one of the main portion and the clamping portion includes an inwardly-projecting edge engageable against the frame member, the inwardly-projecting edge being defined by two inclined surfaces at sides of a flat interior surface.

* * * * *